(12) United States Patent
Hong et al.

(10) Patent No.: US 8,883,360 B2
(45) Date of Patent: Nov. 11, 2014

(54) BURNER REFORMER FOR FUEL CELL POWER GENERATING SYSTEM

(75) Inventors: Wen-Tang Hong, Nantou County (TW); Cheng-Nan Huang, Taoyuan County (TW); Yu-Ching Tsai, Taoyuan County (TW); Hsueh-I Tan, New Taipei (TW); Shih-Kun Lo, Taoyuan County (TW); Ming-Dar Lin, Taoyuan County (TW); Chen-Po Lai, Hsinchu County (TW); Yung-Neng Cheng, Taoyuan County (TW); Ruey-Yi Lee, Taoyuan County (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 663 days.

(21) Appl. No.: 13/280,403

(22) Filed: Oct. 25, 2011

(65) Prior Publication Data
US 2013/0101912 A1    Apr. 25, 2013

(51) Int. Cl.
*H01M 8/06* (2006.01)
*C01B 3/38* (2006.01)

(52) U.S. Cl.
CPC .................. *C01B 3/384* (2013.01); *Y02E 60/50* (2013.01); *H01M 8/0618* (2013.01); *C01B 2203/066* (2013.01); *C01B 2203/0827* (2013.01); *C01B 2203/0227* (2013.01); *C01B 2203/0244* (2013.01)
USPC ............................................ 429/423; 429/425

(58) Field of Classification Search
None
See application file for complete search history.

(56) References Cited

U.S. PATENT DOCUMENTS

| | | | |
|---|---|---|---|
| 7,156,886 B2 * | 1/2007 | Nakamura et al. | 48/127.9 |
| 2010/0136378 A1 * | 6/2010 | Lee et al. | 429/19 |
| 2011/0097646 A1 * | 4/2011 | Tsai et al. | 429/505 |
| 2011/0177409 A1 * | 7/2011 | Yen et al. | 429/423 |

* cited by examiner

*Primary Examiner* — Patrick Ryan
*Assistant Examiner* — Adam A Arciero
(74) *Attorney, Agent, or Firm* — Jackson IPG PLLC

(57) ABSTRACT

A burner reformer is provided for a power generating system using fuel cell. A burner is contained inside the reformer. The reformer absorbs heat from the burner and other heat source to reduce heat loss and save connecting wires. The present invention avoids flashing back of hydrogen. When fuel is lean, flame would not easily die and the system can thus work stably.

6 Claims, 4 Drawing Sheets

BURNER REFORMER FOR FUEL CELL POWER GENERATING SYSTEM

TECHNICAL FIELD OF THE INVENTION

The present invention relates to a reformer; more particularly, relates to providing a burner reformer used in a power generating system using fuel cell.

DESCRIPTION OF THE RELATED ARTS

Oil consuming brings in problems of environmental contamination and resource wasting, which also leads to greenhouse effect. Hence, new energy technologies are developed. Wind power is limited to local environment, tide power is the same, geothermal energy has no difference, and solar cell has problem in low conversion rate. Yet, fuel cell has low pollution rate, small noise, high efficiency and wide application. Hence, it has become one of the key energy technologies to be developed. Fuel cell does not burn a traditional fuel to generate heat, but convert chemical energy into electric energy to generate heat, which usually consumes hydrogen as a fuel.

Since hydrogen usually does not exist alone in nature, hydrogen generating system becomes one of the critical issues. Methane, methanol, ethanol, gas, liquefied petroleum gas, oil, etc. can be sources for generating hydrogen through reformation. A reformer can be used to reform a fuel selected from the above sources into a hydrogen-rich gas in a high-temperature environment. The reformer needs different type of heat according to its own type. For improving system efficiency, residual fuel obtained after electrochemical reaction in a burner is usually recycled for combustion to improve heat in a high-temperature tail-gas for processing reformation in the reformer.

However, the reformer is usually operated above 800 Celsius degrees (° C.) and the burner is set aside from the reformer, so that the burner has to connect to the reformer through tubes or pipes. But, the high temperature is hard to be kept. For solving the problem, the burner is sometimes operated under 1000° C., which raises operational risk.

In the U.S. Pat. No. 7,156,886 B2 patent, a burner is integrated with a reformer. But, it only stacks the burner and the reformer. The burner is position under the reformer to provide tail gas after combustion to the reformer for reformation. Yet, heat loss is still great. In US 2010/0136378 A1 patent, the burner avoids flashing back of hydrogen. Yet, when the fuel is lean, flame may die and the whole system may be thus stopped. Hence, the prior arts do not fulfill all users' requests on actual use.

SUMMARY OF THE INVENTION

The main purpose of the present invention is to provide a burner reformer having a simple structure to be easily operated with improved efficiency, reduced contamination and lowered cost.

The second purpose of the present invention is to not only avoid flashing back of hydrogen but also help system run stably to keep from flaming out even when fuel is lean.

To achieve the above purposes, the present invention is a burner reformer for a fuel cell power generating system, comprising a gas inlet, a residual fuel inlet, an oxidant inlet, a spraying device, a porous media burner, a fuel inlet, a pre-heater, a distributing ring, a spreading plate, a plurality of fuel reformers, an igniter, a first tail-gas outlet, a plurality of tail-gas deflectors, a guiding channel, a guiding blade, a second tail-gas outlet, a plurality of outlets of burner reformer and an reformate gas outlet, where a hydrogen-rich gas generated from the burner reformer is directly provided for electrochemical reaction in solid oxide fuel cell (SOFC) or, for electrochemical reaction with proton exchange membrane (PEM) to generate electric energy coordinated with removing carbon monoxide and cooling down temperature. Accordingly, a novel burner reformer for a fuel cell power generating system is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the sectional view showing the preferred embodiment according to the present invention;

DESCRIPTION OF THE PREFERRED EMBODIMENT

Figure 1:
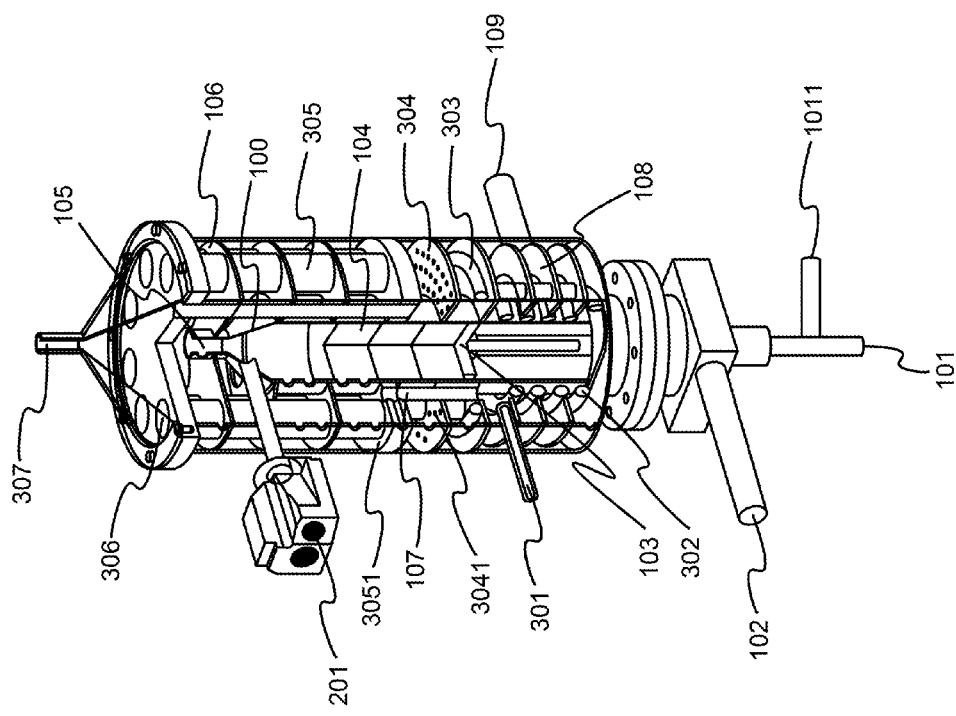

The following description of the preferred embodiment is provided to understand the features and the structures of the present invention.

Please refer to FIG. 1 to FIG. 4, which are a sectional view showing a preferred embodiment according to the present invention; a view showing a spraying device; a view showing a distributing ring; and a view showing a state of use of the present invention. As shown in the figures, the present invention is a burner reformer for a fuel cell power generating system, comprising a gas inlet 101, a residual fuel inlet 1011, an oxidant inlet 102, a spraying device 103, a porous media burner 104, a first tail-gas outlet 105, a plurality of tail-gas deflectors 106, a guiding channel 107, a guiding blade 108, a second tail-gas outlet 109, an igniter 201, a fuel inlet 301, a pre-heater 302, a distributing ring 303, a spreading plate 304, a plurality of fuel reformer 305, a plurality of outlets of burner reformer 306 and a reformate gas outlet 307.

The gas inlet 101 guides a gas to enter.

The residual fuel inlet 1011 is connected with the gas inlet 101 to guide an unreacted residual hydrogen-rich gas to enter.

The oxidant inlet 102 guides an oxidant to enter for providing an oxygen-contained gas or fuel. Therein, the oxidant is a high-temperature oxygen-contained gas at cathode outlet of a cell stack; a general normal- or high-temperature gas; or a cooled-down gas from the cathode outlet of the cell stack.

Figure 2:
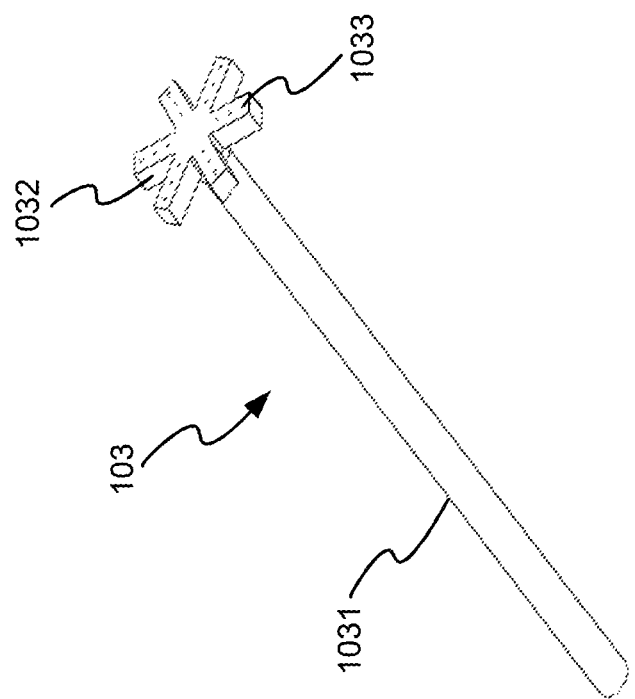
FIG. 2 is the view showing the spraying device.

The spraying device 103, as shown in FIG. 2, is positioned in a combustion chamber 100 and is connected with the gas inlet 101 and the residual fuel inlet 1011. The spraying device 103 comprises a fuel tube 1031; a plurality of branch tube 1032; and a spraying hole 1033 located on each branch tube 1032. The spraying device 103 guides the gas or fuel to enter from the fuel tube 1031 to be directly sprayed from the spraying hole 1033. The gas or fuel is sprayed in the porous media burner 104 to process a burning reaction with gas entered from the oxidant inlet 102.

The porous media burner 104 is located on the spraying device 103 in the combustion chamber 100 to burn the fuel entered from the spraying device 103, which is mixed with the oxidant entered from the oxidant inlet 102.

The first tail-gas outlet 105 is connected at an upper terminal of the combustion chamber 100 to output a high-temperature tail-gas obtained after combustion.

The tail-gas deflector 106 surrounds the first tail-gas outlet 105 and the combustion chamber 100 at outside to guide the high-temperature tail-gas entered from the first tail-gas outlet 105 for providing heat to process reformation with a catalyst in the fuel reformer 305.

The guiding channel 107 penetrates through a loading plate 3051 to pass the high-temperature tail-gas from the loading plate 3051 to the spreading plate 304 without contacting the distributing ring 303.

The guiding blade 108 surrounds the combustion chamber 100 and is located on a lower surface of the distributing ring 303. The guiding blade 108 is an area for processing pre-heating to the high-temperature tail-gas entered from the guiding channel 107.

The second tail-gas outlet 109 outputs the high-temperature tail-gas to be collected.

The igniter 201 is located on the porous media burner 104 to obtain energy for activating the burner reformer 305 to process burning in the porous media burner 104.

The fuel inlet 301 guides a to-be-reformed fuel to enter, where the to-be-reformed fuel comprises gas, air and water and is changeable according to fuel formula and reforming method.

The pre-heater 302 surrounds the combustion chamber 100 at outside to absorb heat of a high-temperature tail-gas to pre-heat fuel.

Figure 3:
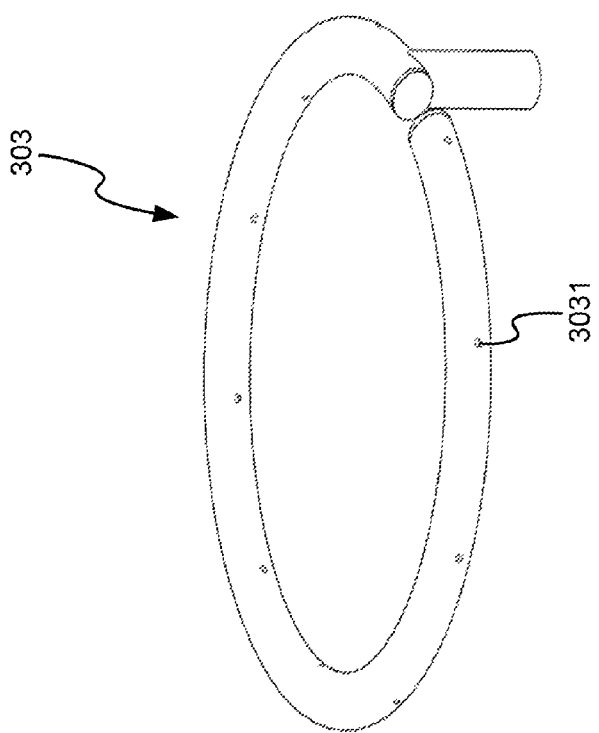
FIG. 3 is the view showing the distributing ring.

The distributing ring 303, as shown in FIG. 3, surrounds the combustion chamber 100 at outside and is located above the pre-heater 302. The distributing ring 303 has a plurality of fuel distributing holes 3031 to uniformly spray the pre-heated fuel by the fuel distributing holes 3031. Thus, the fuel is uniformly sprayed to enter the spreading plate 304 for reformation in the fuel reformer 305.

The spreading plate 304 surrounds the combustion chamber 100 at outside and is located on the distributing ring 303. The spreading plate 304 has a plurality of spreading holes 3041 to uniformly spread the sprayed fuel by the spreading holes 3041, where the distributing ring 303 and the spreading plate 304 are combined to form a distribution spreading area.

The fuel reformer 305 surrounds the combustion chamber 100 and is located on the spreading plate 304 to be loaded on the loading plate 305 for reformation to generate hydrogen-rich gas.

Each of the outlets of burner reformer 306 is located on the fuel reformer 305 to output a reformed hydrogen-rich gas.

The reformate gas outlet 307 is located on the outlets of burner reformer 306 to guide the hydrogen-rich gas to a cell stack to generate electric energy through electrochemical reaction.

Figure 4:
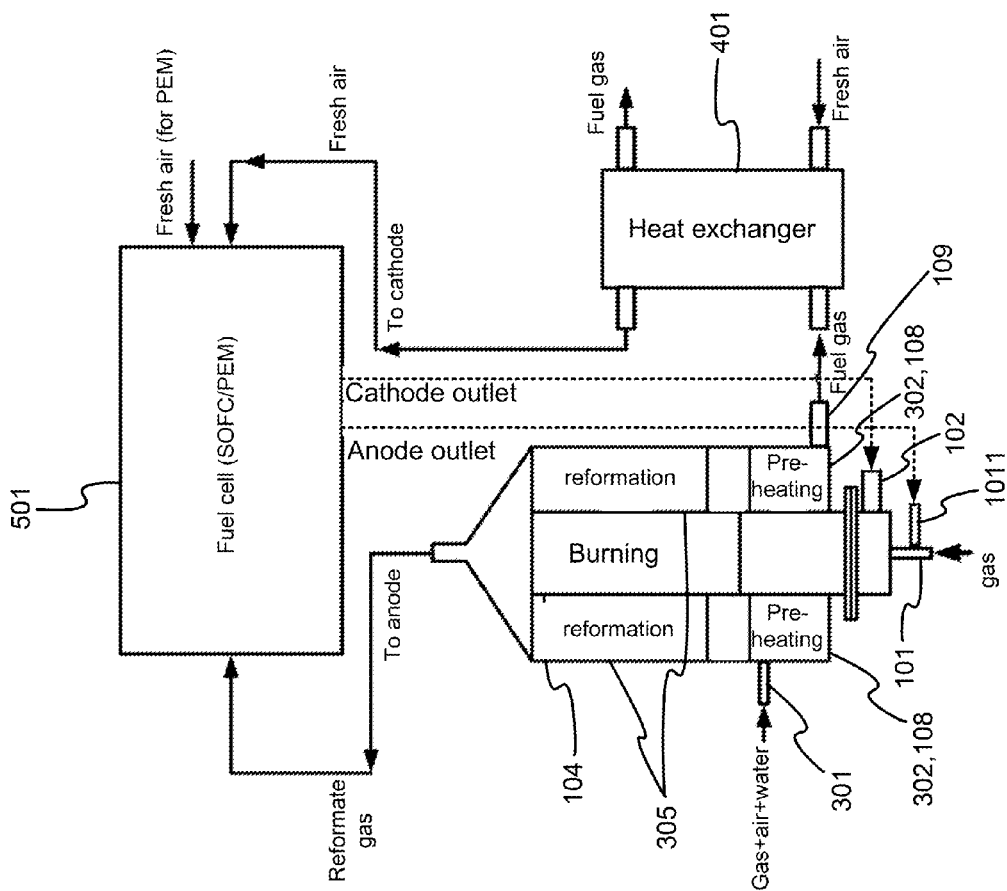
FIG. 4 is the view showing the state of use of the present invention.

On using the present invention for generating hydrogen, gas entered from the spraying device 103 and air entered from the oxidant inlet 102 are mixed in the porous media burner 104 for burning through activating the burner reformer 306 by the igniter 201. The high-temperature tail-gas obtained after combustion enters into the tail-gas deflector 106 through the first tail-gas outlet 105 for reformation with a catalyst in the fuel reformer 305. Then, through the guiding channel 107, the high-temperature tail-gas penetrates through the spreading plate 304 and the distributing ring 303 of the distribution spreading area. Then, the high-temperature tail-gas enters the guiding blade 108 to provide heat to pre-heat fuel. At last, the high-temperature tail-gas is output to a heat exchanger 401 through the second tail-gas outlet 109 (as shown in FIG. 4) to absorb extra heat for fully using the heat in combustion. For reformation, the fuel flows into the pre-heater 302 from the fuel inlet 301 to absorb heat from the high-temperature tail-gas for pre-heating. Then, the fuel enters into the distributing ring 303 to be sprayed by the distributing ring 303. Then, after being uniformly spread through the spreading plate 304, the fuel enters into the fuel reformer 305 for reformation to generate hydrogen-rich gas. At last, the reformate gas enters into the cell stack 501 from the reformate gas outlet 307 for generating electric energy through electrochemical reaction. Un-reacted residual hydrogen-rich gas is guided to the anode residual fuel outlet 1011 to enter the burner reformer 100 for combustion through the spraying device 103. At the same time, the gas entered from the gas inlet 101 can be reduced to none gradually until the whole system is stably run without inletting any gas.

As shown in FIG. 4, the hydrogen-rich gas thus generated is directly provided for electrochemical reaction in solid oxide fuel cell (SOFC) to generate electric energy; or, for electrochemical reaction with proton exchange membrane, (PEM) to generate electric energy coordinated with removing carbon monoxide and cooling down temperature. Then, the residual fuel obtained after the electrochemical reaction is guided to the spraying device 103 of the burner reformer 100 for recycling to improve system efficiency and reduce environmental contamination. Thus, the present invention has a simple structure and is easily operated with improved efficiency, reduced contamination and lowered cost. Furthermore, the temperature distribution in area of the combustion is very uniform for high practicality, whose gradient is within 30 Celsius degrees (° C.).

Concerning characteristics of the present invention, a burner is contained inside of a reformer; heat of a high-temperature generated after combustion in the burner is absorbed; and, conductive and radiating heat of the burner is absorbed. Thus, surface temperature is reduced and no pipes are required for connecting the reformer and the burner. Heat loss is reduced and operational temperature of the burner is lowered as well to diminish operational risk. The burner used in the present invention is a non-premixed porous media burner, which not only avoids flashing back of hydrogen but also helps system run stably to keep from flaming out even when fuel is lean.

To sum up, the present invention is a burner reformer for a fuel cell power generating system, where the present invention has a simple structure and is easily operated with improved efficiency, reduced contamination and lowered cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A burner reformer for a fuel cell power generating systems, comprising a gas inlet, said gas inlet guiding a gas to enter; a residual fuel inlet, said residual fuel inlet being connected with said gas inlet, said residual fuel inlet guiding an unreacted residual hydrogen-rich gas to enter to obtain a fuel, said fuel being obtained by mixing said unreacted residual hydrogen-rich gas and said gas from said gas inlet; an oxidant inlet, said oxidant inlet guiding an oxidant to enter to burn gas; a spraying device, said spraying device being positioned in a combustion chamber, said spraying device being connected with said gas inlet and said residual fuel inlet, said spraying device comprising a fuel tube; a plurality of branch tubes; and a spraying hole located on each one of said branch tubes, wherein said spraying device guides said fuel to enter from said fuel tube to be directly sprayed by said spraying hole located on each one of said branch tubes; a porous media burner, said porous media burner being positioned on said spraying device in said combustion chamber to combust said fuel sprayed by said spraying device and said oxidant obtained from said oxidant inlet; a fuel inlet, said fuel inlet guiding a to-be-reformed fuel to enter; a pre-heater, said pre-heater surrounding said combustion chamber to absorb heat of a high-temperature tail-gas to pre-heat fuel; a distributing ring, said distributing ring surrounding said combustion chamber at outside, said distributing ring being located on said pre-heater, said distributing ring having a plurality of fuel distributing holes to uniformly spray said pre-heated fuel by said fuel distributing holes; a spreading plate, said spreading plate surrounding said combustion chamber, said spreading plate being located on said distributing ring, said spreading plate having a plurality of spreading holes to uniformly spread said sprayed fuel by said spreading holes; a plurality of fuel reformers, said fuel reformers surrounding said combustion chamber, said fuel reformers being located on said spreading plate, said fuel reformers being loaded on said loading plate to process reformation to obtain hydrogen-rich gas; an igniter, said igniter being located on said porous media burner to obtain energy to activate said burner reformer to process burning in said porous media burner; a first tail-gas outlet, said first tail-gas outlet being connected at a terminal of said combustion chamber to output a high-temperature tail-gas obtained after combustion; a plurality of tail-gas deflectors, said tail-gas deflectors surrounding said first tail-gas outlet and said combustion chamber to guide said high-temperature tail-gas entered from said first tail-gas outlet to provide heat to process reformation with a catalyst in said fuel reformers; a guiding channel, said guiding channel penetrating through said loading plate to pass said high-temperature tail-gas from said loading plate to said spreading plate without contacting said distributing ring; a guiding blade, said guiding blade surrounding said combustion chamber, said guiding blade being located on an end surface of said distributing ring, said guiding blade being an area to process pre-heating to said high-temperature tail-gas entered from said guiding channel; a second tail-gas outlet, said second tail-gas outlet outputting said high-temperature tail-gas to be collected; a plurality of outlets of burner reformer, said outlets of burner reformer being located on said fuel reformers to output reformed hydrogen-rich gas; and a reformate gas outlet, said reformate gas outlet being located on said outlets of burner reformer to guide said hydrogen-rich gas to a cell stack.

2. The burner reformer according to claim 1,
wherein said distributing ring and said spreading plate are combined to obtain a distribution spreading area.

3. The burner reformer according to claim 1,
wherein said second tail-gas outlet is connected with a heat exchanger to collect said high-temperature tail-gas.

4. The burner reformer according to claim 1,
wherein said oxidant is selected from a group consisting of a high-temperature oxygen-rich gas at a cathode outlet of said cell stack; and an outlet gas of said cell stack; and
wherein said outlet gas of said cell stack is cooled down from a high temperature by a cooling gas.

5. The burner reformer according to claim 1,
wherein said fuel is reformed to generate hydrogen and ratio of said hydrogen is adjustable.

6. The burner reformer according to claim 5,
wherein said fuel comprises gas, air and water.

* * * * *